(12) United States Patent
Kwok et al.

(10) Patent No.: US 8,424,059 B2
(45) Date of Patent: Apr. 16, 2013

(54) CALCULATING MULTI-TENANCY RESOURCE REQUIREMENTS AND AUTOMATED TENANT DYNAMIC PLACEMENT IN A MULTI-TENANT SHARED ENVIRONMENT

(75) Inventors: Thomas Yu-Kiu Kwok, Washington Township, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 12/235,225

(22) Filed: Sep. 22, 2008

(65) Prior Publication Data

US 2010/0077449 A1    Mar. 25, 2010

(51) Int. Cl.
  *G06F 21/00* (2006.01)
(52) U.S. Cl.
  USPC ............... 726/3; 718/104; 717/100; 709/226; 709/217
(58) Field of Classification Search ...... 726/3; 718/104; 717/100; 709/226, 217
  See application file for complete search history.

(56) References Cited

U.S. PATENT DOCUMENTS

| 6,067,545 | A  | * | 5/2000  | Wolff ................................. 1/1 |
| 6,092,178 | A  | * | 7/2000  | Jindal et al. ...................... 712/27 |
| 6,718,361 | B1 | * | 4/2004  | Basani et al. .................. 709/201 |
| 6,771,595 | B1 | * | 8/2004  | Gilbert et al. ................. 370/229 |
| 6,880,156 | B1 | * | 4/2005  | Landherr et al. ............. 718/105 |
| 6,907,395 | B1 | * | 6/2005  | Hunt et al. ...................... 703/21 |
| 7,590,746 | B2 | * | 9/2009  | Slater et al. ................... 709/229 |
| 2009/0271472 | A1 | * | 10/2009 | Scheifler et al. .............. 709/202 |

* cited by examiner

*Primary Examiner* — Kambiz Zand
*Assistant Examiner* — Tongoc Tran
(74) *Attorney, Agent, or Firm* — F. Cahu & Associates, LLC; Preston J. Young, Esq.

(57) ABSTRACT

A method for assigning tenants of users to offering instances of an application or middleware includes representing a set of offerings as respective offering instances of the application or middleware available from a server, determining server resource capacity of the server, representing constraints associated with the tenants and the offering instances, generating a mapping of the tenants to the offering instances based on the server resource capacity and constraints, and assigning a tenant to an offering instance according to the mapping, wherein the offering instance is made accessible to the users of the assigned tenant.

17 Claims, 6 Drawing Sheets

CALCULATING MULTI-TENANCY RESOURCE REQUIREMENTS AND AUTOMATED TENANT DYNAMIC PLACEMENT IN A MULTI-TENANT SHARED ENVIRONMENT

BACKGROUND

1. Technical Field

The present invention relates to multi-tenancy software as a service application and middleware, and automated dynamic placement, in particular the automated multi-tenancy dynamic placement advisor.

2. Discussion of Related Art

Software-as-a-Service (SaaS) lowers the cost of development, customization, deployment and operation of a software application while supporting multiple tenants over the Internet. In general, SaaS is associated with business software applications. SaaS is a Web-based software application deployed and operated as a hosted service over the Internet and accessed by users.

Multi-tenants in addition to multi-users supports, installation of application on a managed Internet data center with remote management accessibility are a few characteristics of a multi-tenancy SaaS application.

In the SaaS business model, the ownership, technology infrastructure and management responsibility of the application has moved to application service providers (ASPs) from tenants or customers. It benefits ASPs by reducing hosting cost due to customization and scalability with increasing number of tenants or customers. It also benefits the tenants or customers through their saving in money and time. Tenants can gain immediate access to the latest IT innovations and improvements provided by the ASP without spending their own IT budgets. The cost to use the application can be a per user basis and pays as it goes.

Figure 1:
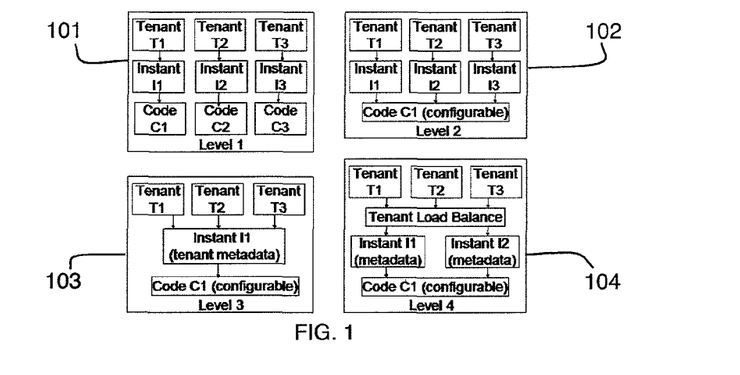
FIG. 1 illustrates four levels of a multi-tenant support model in an application layer.

In a SaaS model, the multi-tenancy support can be applied to four different software layers: the application, middleware, the virtual machine (VM) and the operating system layers. For the application layer, there are four levels of SaaS support model as shown in FIG. 1. Level one 101 has a separate instance for each tenant's customized code base and it is similar to the ASP software application model. Level two 102 has a separate instance for each tenant but the instances come from a single code base with configuration options. With a single application code base to support several tenants, the total deployment time is shorter. Level three 103 has a single instance for all tenants with customized metadata for each tenant. In this level, the updating of application features are simpler and centralized because there is only one instance of a single source code base. Level four 104 has a load-balanced farm of identical instances with customized metadata and configuration options for its tenants.

There are many benefits of multi-tenancy application deployment in Levels three 103 and four 104. The main benefits are the reduction of IT expenses and cost savings in software license fees and hardware expenses by reducing number of development, staging, training, disaster recovery servers and increase usages of storages. Other benefits are in deployment, provisioning, on-boarding and maintenance by reducing IT processes, such as server and application setup and configuration, and reducing support staffs in server and application tuning, backup, patch and upgrade, as well as cooling and HVAC, power and lighting.

However, there are initial setup, configuration and maintenance steps that have to be carried out first in order for the application to support multi-tenants in a SaaS operational structure. There are also a number of challenges that require solutions before the full benefits of multi-tenancy application deployment can be realized. It is difficult to calculate resource requirements for an addition tenant with a number of new users, and to meet the constraints of all tenants in an application instance. Further, an administrator needs the advice on a placement package of multi-tenancy applications on a set of servers without violating any service level agreement (SLA) requirements of all tenants. Also, the cost savings among different multi-tenancy placement packages have to be compared and optimized even there are so many variables involved. In addition, limiting factors and bottle-necks on computing resources required for multiple instances need to be determined, each with multi-tenants of different constraints. It is difficult to automate the placement package in a distributed computing environment. Others challenges are multi-tenancy data models, tenant isolation and security related issues.

To date, there are many reported research activities on the static and dynamic placements of multi-users applications as well as their optimizations. A number of commercial software products for the placement, performance analysis and sizing for multiple applications on a set of servers are also available. However, all these research reports are not tenant aware, and do not take into the account of multi-tenancy application with a single instance supporting multi-tenants in addition to multi-users in each tenant. The available commercial products also do not apply to the placement of multi-tenancy applications. Most manual server estimates are oversized and thus more expensive.

BRIEF SUMMARY

According to an embodiment of the present disclosure, a method for assigning tenants of users to offering instances of an application or middleware includes representing a set of offerings as respective offering instances of the application or middleware available from a server, determining server resource capacity of the server, representing constraints associated with the tenants and the offering instances, generating a mapping of the tenants to the offering instances based on the server resource capacity and constraints, and assigning a tenant to an offering instance according to the mapping, wherein the offering instance is made accessible to the users of the assigned tenant.

According to an embodiment of the present disclosure, a system for assigning tenants of users to offering instances of an application or middleware includes a database for storing multi-tenant information and a processor for executing instructions of a plurality of modules processing the multi-tenant information. The modules include a multi-tenant application module representing a set of offerings as respective offering instances of the application or middleware available from a server, an active placement module determining server resource capacity of the server, a constraint generator module representing constraints associated with the tenants and the offering instances, and a multi-tenant placement module generating a mapping of the tenants to the offering instances based on the server resource capacity and constraints and assigning a tenant to an offering instance according to the mapping, wherein the offering instance is made accessible to the users of the assigned tenant.

According to an embodiment of the present disclosure, a method for assigning, with constraints, tenants of users to offering instances includes collecting a resource usage profile of each offering instance of a software application or middleware on each server, determining resource usage of the offering instances and a residual resource of each server, retrieving constraints for tenants on a shared offering instance of the application or middleware on a server, determining required resources with the constraints for tenants in the shared offering instance on the server, generating a mapping of the tenants to the shared offering instance based on the resource usage of the offering instance of the application or middleware, the resource capacity of the server and the constraints of the tenant, and assigning the tenant to the shared offering instance according to the mapping, wherein the shared offering instance is made accessible to the users of the assigned tenant.

According to an embodiment of the present disclosure, a method for dynamic and rule-based multi-tenant placement includes determining a maximum resource demand of a plurality of tenants for each offering instance of an application, determining constraints of the tenants, determining a resource demand for each server with all offering instances, constructing a rule-based placement list satisfying the constraints, according to a priority rule list, locating a server and an offering instance on the server having a lowest residual resource among all servers, and relocating the tenants from the server to increase a residual resource the server.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an exemplary embodiment of the present disclosure, customization, deployment and operation of a software application to support multiple customers or tenants in a software application business model called multi-tenancy Software as a Service (SaaS) can be performed with extended resources for additional tenants, wherein each tenant is a set of one or more users having common tenancy information associated with an application.

According to an exemplary embodiment of the present disclosure, in a distributed computing environment an application can demand a number of computing resources, such as CPU, memory, storage disk and network bandwidth, from physical hardware of the host server. An application instance may need an initial amount of storage, such as initialization of tables. These tables are shared among tenants and users. Additional storage is needed to store data for each additional tenant or user, such as adding additional tables and/or rows in different tables. Thus, storage usage can be assumed to be load dependent and proportional to numbers of tenants or users. Similarly, significant amount of memory in dynamic random access memory (DRAM) is consumed by an instance even if there is no active tenant or user. There are paged and non-paged memory. Non-paged memory includes a range of virtual addresses guaranteed to be in DRAM at all times, and paged memory can be swapped to slower system resources, such as hard disk. As a result, it can be difficult to accurately project memory usage based on the number of tenants and users in a shared instance. Many applications cannot run when the system is out of memory. Thus, only the maximum memory usage can be assumed slightly dependent on the number of tenants and users. Hence, an estimated upper limit on memory usage can be used. In some advance VMs, each instance may be able to use multiple CPUs if the host hardware physically contains multiple CPUs. Unlike storage and memory, CPU usage with same clock speed and same amount of Levels 1, 2 and 3 static RAM (SRAM) caches can be assumed to be linearly proportional to the number of active tenants and users because the processing speed of a CPU depends on both clock speed and cache.

Herein, CPU and storage are used to illustrate calculations of resource requirements.

Let r be the number of users, and C(r) and M(r) be the CPU and storage required by an instance with multi-users, respectively. Then, $$C(r)=f_{CU}(r).$$

$$M(r)=M_0+f_{MU}(r). \qquad (1)$$

where $f_{CU}(r)$ and $f_{MU}(r)$ are functions of r, assuming that the CPU instance is idle if there is no active user. $M_0$ is a constant representing overhead storage used by the instance without any users. However, calculations of resources required for a shared instance supporting multi-tenants and multi-users are new and complicated. Let t be the number of tenants in a shared instance and n be the total number of users. Then, $$C(n,t)=f_{CU}(n)+f_{CT}(t).$$

$$M(n,t)=M_0+f_{MU}(n)+f_{MT}(t). \qquad (2)$$

where $f_{CT}(t)$ and $f_{MT}(t)$ are functions of t. These two functions are additional CPU and storage required to isolated tenants from each other in a shared instance. For a special case where there are two tenants t=2 and the number of users in the two tenants are both equal to r such that n=2r. Let us compare resources required in this special case deployed in two different computing environments. In two application instances, each with a tenant and r users, and from Equations (1):

$$2C(r,1)=2C(r)=2f_{CU}(r).$$

$$2M(r,1)=2M(r)=2M_0+2f_{MU}(r). \qquad (3)$$

In one application instance with two tenants and r users in each tenant, and from Equations (2):

$$C(2r,2)=f_{CU}(2r)+f_{CT}(2).$$

$$M(2r,2)=M_0+f_{MU}(2r)+f_{MT}(2). \qquad (4)$$

Assuming $f_{CU}(r)$ and $f_{MU}(r)$ are linearly proportional to r, taking the first order approximation:

$$f_{CU}(2r)=2f_{CU}(r).$$

$$f_{MU}(2r)=2f_{MU}(r). \quad (5)$$

Since a certain amount of storage is shared by both tenants, and additional amount of storage required to isolate tenants from each other is relative small in a shared instance, then:

$$f_{MT}(2)<<M_0. \quad (6)$$

According to Equations (5) and (6):

$$f_{CU}(2r)+f_{CT}(2)>2f_{CU}(r).$$

$$M_0+f_{MU}(2r)+f_{MT}(2)<<2M_0+2f_{MU}(r). \quad (7)$$

Thus from Equations (3), (4) and (7):

$$C(2r,1)>2C(r,1).$$

$$M(2r,2)<<2M(r,1). \quad (8)$$

There are savings in those resources shared by multi-tenants, such as storage and memory, but at the same time a more usage of resources, such as CPU and network bandwidth, for deploying multi-tenants in a shared instance. Accordingly, tenants can be deployed in a shared instance instead of only one tenant per instance in a server for a multi-tenant SaaS application.

Figure 2:
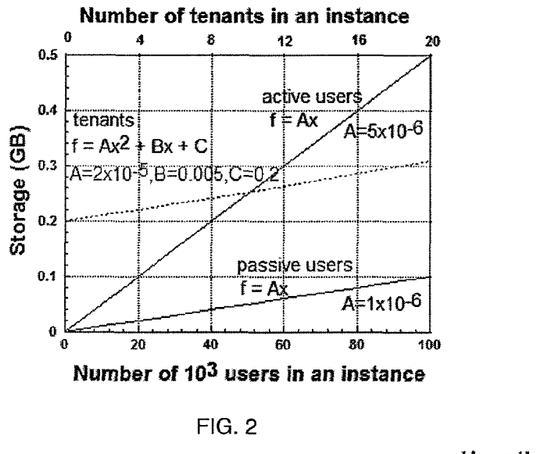
FIG. 2 is a graph of hypothetical data of storage requirements as a function of active and passive users, and tenants.

Functions $f_{CU}(n)$, $f_{MU}(n)$, $f_{CT}(t)$ and $f_{MT}(t)$ can be in the form of curves or tables of measured data. Equations based partially on theory and partially on these empirical data can be obtained by fitting these curves or tables with interpolation or extrapolation algorithms. These semi-empirical equations can be linear, polynomial, power, exponential, logarithmic, etc. depending on fractions of different activities, such as Web, computation, transaction and database, involved in the application. Hypothetical data of storage requirements as a function of users and tenants in a shared instance are shown in FIG. 2. Assuming that storage usage by each user is independent from other users, and from the total number of users, semi-empirical parameters based on the first order approximation are obtained by fitting solid curves in FIG. 2. However, storage usage by each tenant may increase with the total number of tenants in the shared instance because additional storage is needed to isolate each tenant from the increasing number of other tenants. Thus, semi-empirical parameters based on the second order approximation are obtained by fitting the dotted curve in FIG. 2.

As shown in FIG. 2, passive users also demand storage usage but their usage is much less than that of active users. This is also true for memory usage. Let x be the concurrent user or peak load rate of an application instance and y be the utilization rate of a server. Lowering the utilization rate below 1.0 will provide higher service reliability and increase uptime, which will eliminate or reduce fines caused by missed SLA requirements. Let u and p be total numbers of active and passive users in a shared instance, respectively. Thus, $$u=n*x.$$

$$p=n*(1.0-x). \quad (9)$$

According to Equations (2) and (9), the total storage required by t tenants with total number of users n in a shared instance is given by $$M(n,t)=(f_{MU}(u)+f_{MU}(p)+M_0+f_{MT}(t))/y. \quad (10)$$

where $f_{MU}(u)$ and $f_{MU}(p)$ are obtained from two solid curves while $M_0$ and $f_{MT}(t)$ are obtained from the dotted curve. As shown in FIG. 2, $M_0$ is the intercept on the Y-axis when t=0 or 1 as an application instance either requires no tenant or a minimum of one tenant for initialization. Similarly, the total CPU required by t tenants with total number of users n in a shared instance is given by $$C(n,t)=(f_{CU}(u)+f_{CT}(t))/y. \quad (11)$$

assuming that the CPU instance is idle if there is no active user. Other computing resources, such as memory and network bandwidth, required by multi-tenants in a shared instance can be calculated in similar ways using either Equations (10) or (11).

Calculated computing resources, such as CPU and storage, based on the number of users and tenants in a shared instance are the basic or minimum requirements of available resources in any server on which the shared instance would run. However, there are also a number of constraints on limiting the maximum number of users and tenants on this shared instance running in any server of specific resource. These constraints include response time, availability, user arrival and page view rates, business transaction rate, request and transfer rates for database, input and output operational rates on file system, disaster recovery, cost and reporting metrics, in SLA specifications, etc. Operating the shared instance within these constraints will reduce or eliminate fines caused by missed SLA requirements.

Figure 3:
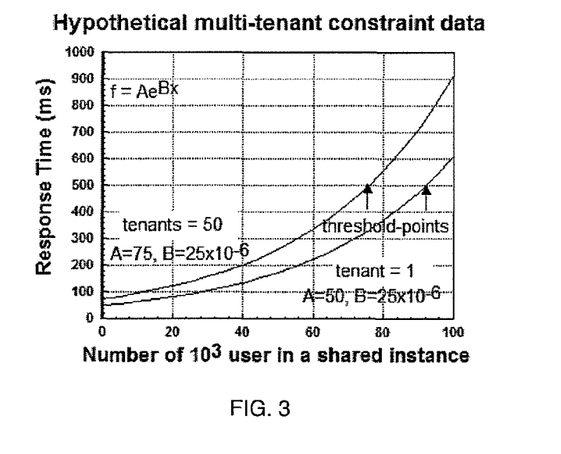
FIG. 3 is a graph of hypothetical data of response time as functions of user and tenant numbers.

Calculations of the maximum number of users on an instance in any server of specific resources without violating any SLA requirements have been outlined. However, calculations of maximum numbers of users and tenants on a shared instance running in any server of specific resources satisfying all constraints listed on SLA specifications of all tenants are new and complicated. Herein, response time is used to illustrate calculations of resource requirements with applied constraints; other resources or constraints may be used. Hypothetical data of response time limiting the maximum number of users and tenants on a shared instance in any server of specific resources is shown in FIG. 3. Semi-empirical parameters based on the exponential approximation are obtained by fitting these two curves. Let the constraint on response time listed on SLA specifications be 500 ms, then the maximum number of users allowed in an instance with only 1 tenant is around $92 \times 10^3$ while that in a shared instance with 50 tenants is around $75 \times 10^3$. The maximum number of users on a shared instance with t tenants can be found by interpolation or extrapolation of these two curves. The maximum number of users and tenants allowed in a shared instance running on any server of specific resources for other constraints listed on SLA specifications of all tenants can be carried out in a similar way.

Figure 4:
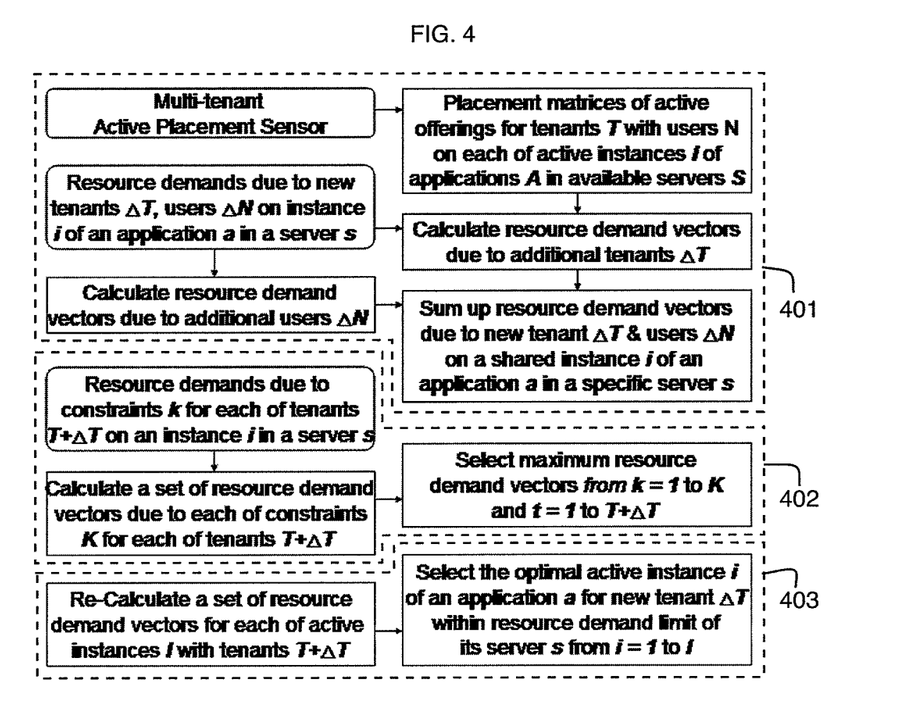
FIG. 4 is a flow chart of a method for multi-tenancy resource calculations with applied constraints.

An exemplary algorithm for multi-tenant resource calculations with applied constraints is illustrated in FIG. 4. Let J be the total number of resource types and its index j is from 1 to J. Here, two resource types (J=2), CPU C(j=1) and storage M(j=2), are used to demonstrate multi-tenant resource calculations. Other resource parameters, such as network bandwidth and memory, can be added into these calculations in similar ways. Let S be the total number of available servers and its index s is from 1 to S. The exemplary method of FIG. 4 can be divided into three stages or portions. At portion 401, a multi-tenant active placement sensor provides information on current resource usage of tenants $T_i$ with users $N_i$ in each i of shared instances I of applications A, as well as residual resources in available servers S. Resource demands due to new tenants $\Delta T_i$ and new users $\Delta N_i$ are determined on an active instance i of an application a in a specific server s. Let $C_{0i}(N+\Delta N, T+\Delta T)$ and $M_{0i}(N+\Delta N, T+\Delta T)$ represent two sets of resource demand vectors for minimum CPU and storage requirements due to additional tenants ΔT and additional users ΔN on an instance i of an application a in a server s. According to Equations (2), $$C_{0i}(N+\Delta N, T+\Delta T)=C_{0i}(N+\Delta N)+C_{0i}(T+\Delta T);$$

$$M_{0i}(N+\Delta N, T+\Delta T)=M_{0i}(N+\Delta N)+M_0+M_{0i}(T+\Delta T); i \in I. \quad (12)$$

At portion 402, resource demand vectors due to each of tenants T+ΔT with users N+ΔN in an active instance i with each k of a set of applied constraints K are determined, such as response time and transaction rate. The maximum resource demand vectors are selected from k=1 to K and t=1 to T+ΔT:

$$C_{max,i}(N+\Delta N, T+\Delta T)=\text{Max}\{C_{0i}(N+\Delta N, T+\Delta T), C_{ki}(t)\};$$
$$\forall k \in K.$$

$$M_{max,i}(N+\Delta N, T+\Delta T)=\text{Max}\{M_{0i}(N+\Delta N, T+\Delta T), M_{ki}(t)\};$$
$$\forall t \in T+\Delta T. \quad (13)$$

where $C_{ki}(t)$ and $M_{ki}(t)$ are resource demand vectors of CPU and storage due to constraint k on tenant t of instance i. At portion 403, a set of resource demand vectors for each i of shared instances I with tenants T+ΔT and users N+ΔN. The resource demand for a server s is calculated by sum over i=1 to I and a=1 to A on each s of available servers S are re-determined. The residual resource of a server s is given by Equations (14):

$$C_{residual}(s)=C_{initial}(s)-\Sigma_{ia} C_{max,i}(N+\Delta N, T+\Delta T); s \in S.$$

$$M_{residual}(s)=M_{initial}(s)-\Sigma_{ia} M_{max,i}(N+\Delta N, T+\Delta T); \forall i \in I,$$
$$\forall a \in A. \quad (14)$$

where $C_{initial}(s)$ and $M_{initial}(s)$ are the initial resource of CPU and storage in a server s, respectively. $C_{residual}(s)$ and $M_{residual}(s)$ are the residual resource in CPU and storage in a server s, respectively if additional tenants $\Delta T_i$ and users $\Delta N_i$ are deployed in its shared instance i of an application a. The initial source must meet or exceed the total resource demand of a server s for each j of all resource types J. The effective residual resource score $E_{residual}(s)$ for all resource types J in a specific server s can then be calculated using several different methods. In the exemplary multi-tenant resource placement tool, a total score over all resource types J with their weighting factors $w_j$ between 0.0 and 1.0 is used. From equations (14):

$$E_{residual}(s)=W_{j=1}*C_{residual}(s)+w_{j=2}*M_{residual}(s)+\ldots;$$
$$s \in S.$$

$$\Sigma_j w_j=1.0; \forall j \in J. \quad (15)$$

Priority rules can be used to set weighting factors $w_j$ of resource type j in the order of its importance and contributions to the effective residual resource score in the list of resource types J. Finally, specific server s* with minimum effective residual resource score is selected for deployment of additional tenants $\Delta T_i$ and users $\Delta N_i$ in its shared instance i of an application a.

Figure 5:
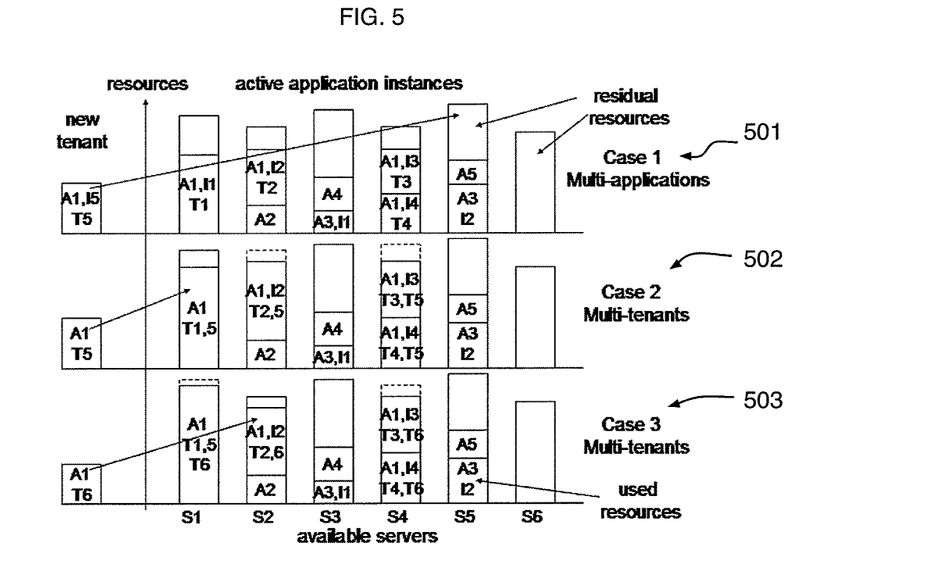
FIG. 5 is a comparative flow diagram of multi-tenant placement models for multiple applications.

The placement of multiple applications in a set of available servers with optimization is illustrated in Case 1 501 of FIG. 5. There are six available servers, namely S1, S2, S3, S4, S5 and S6 with different initial resources and five applications, namely A1, A2, A3, A4 and A5. Four offering instances of the same application A1, namely I1, I2, I3 and I4, have been deployed on S1, S2 and S4. Offering instances of applications A2, A3, A4 and A5 have also been deployed on S2, S3 and S5. The principle rule of optimization in the placement is to deploy a new instance on the server with the smallest residual resource left after meeting the resource requirement of this new instance. As a result, larger chunks of residual resource will be retained in other servers for later use by an offering instance with a higher resource demand. It is assumed that these offering instances in Case 1 501 only support multi-users but not multi-tenants. Thus, a new offering instance I5 of A1 has to be created and deployed for a new tenant T5 even though there are existing instances I1, I2, I3 and I4 of the same application A1 running in S1, S2 and S4. Servers that have large enough residual resource to meet the resource requirement of I5 are S3, S5 and S6. With optimization, the conventional placement methods or commercial products will deploy I5 on S5 to leave larger chunks of residual resource on S3 and S6.

Assuming that all these applications also support multi-tenants in addition to multi-users. Once again, conventional placement methods or commercial products with optimization will still deploy I5 on S5. However, the placement result using an exemplary multi-tenant placement model is different. As illustrated in Case 2 502, a new instance I5 of A1 may not be created for a new tenant T5 because there are existing instances I1, I2, I3 and I4 of the same application A1 running on S1, S2 and S4. The residual resource in one of servers S1, S2 and S4 is tested to determine whether it would be large enough to meet the expanded resource requirement of I1, I2, I3 or I4 with an additional new tenant T5. As shown in Case 2 502, the expanded resource requirement of I1 with two tenants T1 and T5 will be within the resource limit on S1 while that of I2 with two tenants T2 and T5 will exceed the resource limit on S2. The expanded resource requirement of either I3 or I4 with two tenants T3 and T5 or T4 and T5 will also exceed the resource limit on S4. An exemplary multi-tenant placement model with optimization deploys the new tenant T5 into the instance I1 as the second tenant without creating another application instance I5. Case 3 503 illustrates the placement of another new tenant T6 for an application A1. The expanded resource requirement of I1 with three tenants T1, T5 and T6 will exceed the resource limit on S1 while that of I2 with two tenants T2 and T6 will be within the resource limit on S2 this time because the resource requirement for T6 is smaller than that of T5. The expanded resource requirement of either I3 or I4 with two tenants T3 and T6 or T4 and T6 will also exceed the resource limit on S4. Instead of creating a new instance I6, this new tenant T6 for an application A1 will be placed on an existing instance I2 as the second tenant.

In an Internet data center, multiple SaaS offerings of application instances are active on shared physical resources, such as CPU and storage, of a set of computing servers in a distributed computing environment. An SaaS offering is a managed or hosted service of an application, which may include, servers, system administrators, databases, and security. An offering is represented as an offering instance executing on a server; the offering instance is also referred to as an active service and active instance herein. When new tenants subscribe to a SaaS offering, these new tenants need to be assigned to a specific active instance(s) under constraints due to SLA specifications of all tenants. Any server devoted to a new offering must have the needed computing resource capacity to host a new instance or an active instance with additional tenants and users without compromising SLA requirements of all tenants. Moreover, security restrictions on tenants in a shared instance cannot be violated. However, conventional application placement tools are not tenant aware and primarily focus on static or dynamic placement of applications to available servers based on their physical resources with or without load balance or rebalance. In these placement tools, a new application instance is always created and deployed for a new tenant. They cannot assign a new tenant into an active instance because they do not know how much extra resource requirements of an active instance with additional tenants and users.

Figure 6:
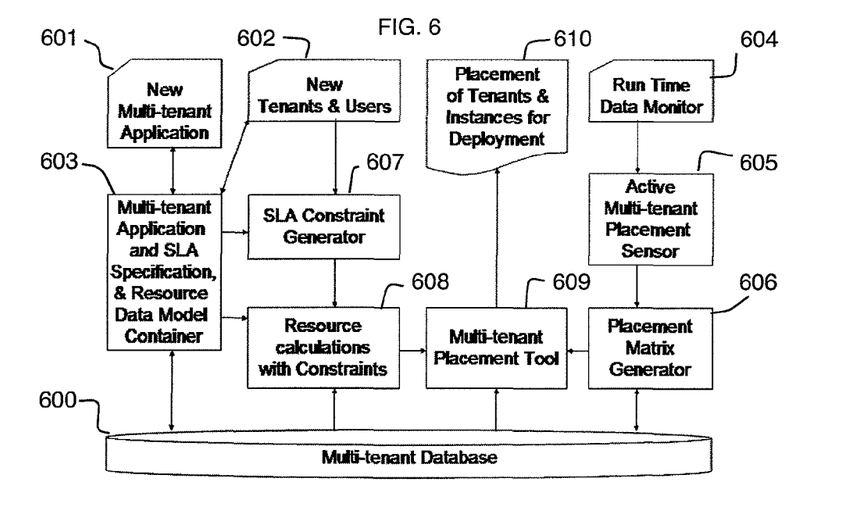
FIG. 6 is a diagram of an architecture framework of a multi-tenancy placement tool.

An architectural framework of an exemplary multi-tenant placement tool is shown in FIG. 6. This framework provides capabilities of multi-tenant resource calculations with applied constraints and the placement of tenants and instances for multi-tenant application deployment. It includes output and input modules, functional modules and a multi-tenant database 600. FIG. 6 also shows the logical flows of information among modules and database. The new multi-tenant application module 601 provides graphical user interface (GUI) and scripts for an administrator to input specifications and multi-tenant data models of a new software application or to modify existing ones. The new tenants and users module 602 provides GUI for an administrator to enter numbers of new tenants and users in each tenant, and select the application required for deployment. The administrator also enters the SLA specification for each new tenant. The multi-tenant application and SLA specification, & data model container module 603 holds, stores, retrieves and deliveries these multi-tenant data from and to other modules and the multi-tenant database. The run time data monitor module 604 monitors and collects resource usage profile of each active instance in each server. It also provides information on performance parameters and utilization rate of each server. The multi-tenant active placement sensor 605 calculates resource usages of each active instance and residual resource of each server. The placement matrix generator 606 constructs and stores resource usage and residual matrices. The dimension of these matrices is two with J×I, where J is the number of resource types and I is the number of instances in a server. The initial resource matrix $O_{initial}(j,s)$ and residual resource matrix $O_{residual}(j,s)$ of resource type j and server s are then constructed based on information from the active placement sensor. They are used in Equations (15). The SLA constraint generator module 607 constructs and stores constraints due to SLA requirements for new tenants, and retrieves constraints for active tenants on a shared instance in a specific server s. The resource calculations with constraints module 608 calculates the physical resources needed, such as CPU, memory, storage and network bandwidth, with applied constraints for new and active tenants in a shared instance on a specific server. This is to make sure that SLA requirements are meet for all tenants in a shared instance. Moreover, cross tenant security restrictions are not violated, such as prohibition of tenant T1 and T2 deployed in the same application instance I1 and/or on the same server S1.

Figure 7:
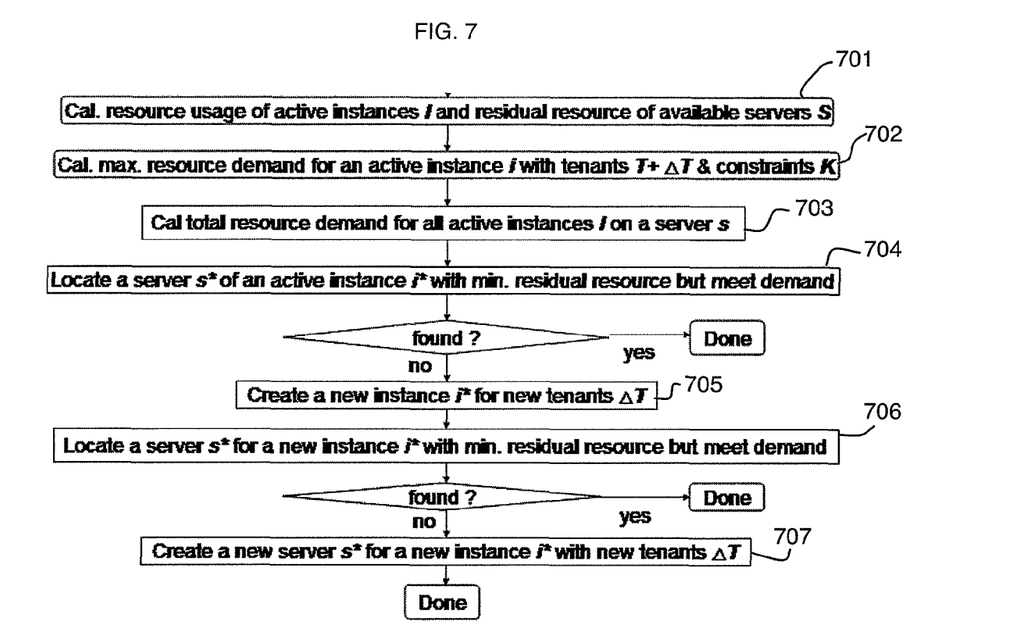
FIG. 7 a flow diagram of a method for multi-tenancy placement.

The multi-tenant placement tool module 609 constructs a package for placements of new tenants on specific instances and/or new instances on specific servers for multi-tenant application deployment 610 according to an exemplary multi-tenant placement model. A flow chart of a multi-tenant placement algorithm is shown in FIG. 7 for an active multi-tenant placement sensor 605 (see FIG. 6). At block 701, resource usage of all instances I, initial and residual resources of all available servers S are calculated based on information from the active placement sensor. At block 702, the maximum resource demand for each shared instance i with tenants T+ΔT and constraints K are calculated. At block 703, the total resource demand for each server s with its shared instance i of tenants T+ΔT and its other instances I−1 are calculated. At block 704, a particular server s* with its particular instance i* of tenants T+ΔT is located because its residual resource is the minimum among all servers s, and within its resource limit. At block 705, a new instance i* is created for new tenants ΔT if a particular s* is not found. At block 706, a particular server s* with the new instance i* is located because its residual resource is the minimum among all servers s with the same new instance i*, and within its resource limit. At block 707, a new instance i* is created in a new server s* for new tenants ΔT if a particular s* is still not found.

While exemplary embodiments of the present disclosure have been described in terms of application software, they are also applicable to, for example, middleware software, which demands a number of computing resources from the host server. Thus, exemplary embodiments of the present disclosure can be applied application software, middleware, etc. Referring now to middleware; a middleware instance uses an initial amount of storage, such as initialization of tables. These tables are shared among users and tenants. Additional storage is used to store data for each additional user or tenant. Thus, storage demand can be assumed to be load dependent and proportional to the number of registered users or tenants. However, it is difficult to accurately project memory demand because there are paged and non-paged memory involved. Thus, the projected upper limit of memory usage can be approached or reached and is assumed to be dependent on the number of users and tenants. CPU demand with the same clock speed and amount of caches can also be assumed to be proportional to the number of users and tenants.

Figure 8:
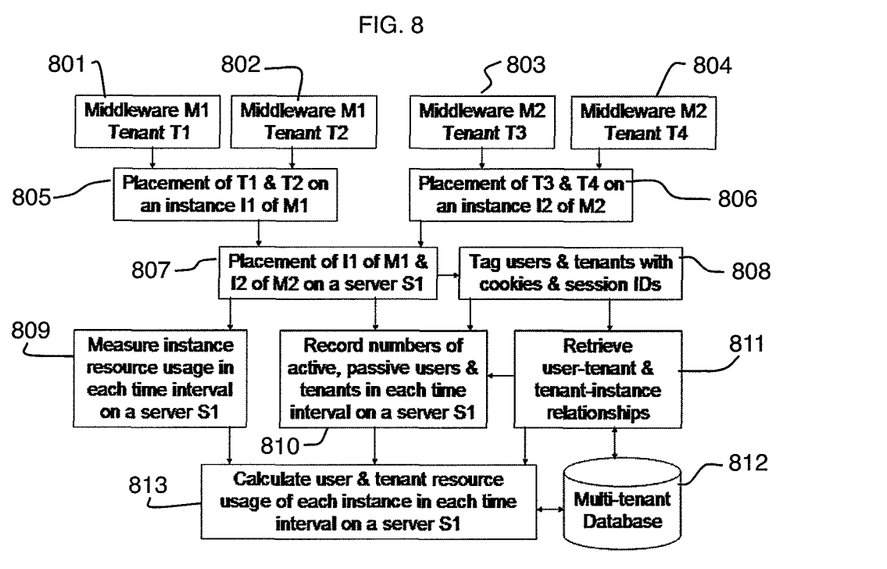
FIG. 8 is a flow diagram for determining user and tenant resource usage in shared middleware instances in a server.

CPU and storage are used to illustrate measurements of resource usage and calculations of resource demand. Let C(u, t) and Q(u,t) be CPU and storage needed by a shared instance with users u and tenants t, respectively.

$$C(u,t)=f_{CU}(u)+f_{CT}(t)$$

$$Q(u,t)=f_{QU}(U)+f_{QT}(t). \quad (16)$$

where $f_{CU}(u)$ and $f_{QU}(u)$ are user resource demand while $fCT(t)$ and $f_{QT}(t)$ are tenant resource demand. Subscripts C, Q, U and T denote CPU, memory, user and tenant, respectively. For illustration purposes, further assume that $f_{CU}(u)$ and $f_{QU}(u)$ are linear functions of u while $f_{CT}(t)$ and $f_{QT}(t)$ are linear functions of t. According to Equations (16) and assuming the instance CPU is idle if there is no active user, the total CPU and storage required by users u and tenants t are given by $$C(u,t)=f_{CU}(u)+f_{CT}(t)=c_1*u+c_2*t.$$

$$Q(u,t)=f_{QU}(u)+f_{QT}(t)=Q_0+q_1*u+q_2*t. \quad (17)$$

where $c_1$, $c_2$, $q_1$ and $q_2$ are empirical constants. $Q_0$ is a constant representing storage overhead used by the shared instance. Other computing resources, such as memory and network bandwidth, can be similarly calculated using Equations (17). An exemplary method for measurement and calculation of user and tenant resource usage on shared instances in a server is shown in FIG. 8. There are four tenants T1, T2, T3 and T4 (801-804). T1 and T2 are placed in a shared instance I1 of middleware M1 805 while T3 and T4 are placed in a shared instance I2 of middleware M2 806. Both I1 and I2 are running on a server S1 807. All users entering I1 and I2 from Web applications are tagged with client cookies and server session IDs 808. For each time interval Δtime, the total CPU resource usage of a specific instance i, $C_i(u,t, \Delta time)$, on S1 is measured 809 such that $$C_i(u,t)=C_i(u,t, \Delta time)/\Delta time. \quad (18)$$

Based on active session IDs on S1, the total number of users U and tenants T on S1 are recorded 810. With client cookies, user-tenant and tenant-instance relationships are retrieved 811 from the multi-tenant database 812. Thus, the number of users u and tenants t in a specific instance i on S1 can be separated from U, T 813. Equations (17) can be solved with a number of measurements of different u and t in different time interval. However, more measurements with better statistics are required to guarantee an accurate result. Hence, the CPU and storage demand for any number of users and tenants in a shared instance of the same middleware running on any similar server can be calculated using the same empirical parameters in Equations (17).

There are constraints to limit the maximum number of users and tenants allowed in a shared instance on a server of specific resource. These constraints include response time, user arrival and page view rates, business transaction rate, request and transfer rates for database in SLA specifications. Operating the shared instance within these constraints will reduce or eliminate fines caused by missed SLA requirements. The multi-tenant active placement sensor provides information on resource usage in each instance and initial resources, $C_{initial}(s)$ and $Q_{initial}(s)$, in each server s. Let J be the total number of resource types and its index j from 1 to J. Let S be the total number of servers and its index s from 1 to S. Let $C_{0i}(U+\Delta U,T+\Delta T)$ and $Q_{0i}(U+\Delta U,T+\Delta T)$ represent CPU and storage resource demand vectors due to additional users $\Delta U$ and tenant $\Delta T$ in a shared instance i. Subscripts i, 0 and k denote instance, non-constraint and constraint, respectively. According to Equations (17), $$C_{0i}(U+\Delta U,T+\Delta T)=C_{0i}(U+\Delta U)+C_{0i}(T+\Delta T);$$

$$Q_{0i}(U+\Delta U,T+\Delta T)=Q_{0i}+Q_{0i}(U+\Delta U)+Q_{0i}(T+\Delta T); i \epsilon I. \quad (19)$$

Then, the maximum resource demand vector is selected from k=1 to K and t=1 to T+$\Delta T$ from resource demand vectors due to each of tenants T+$\Delta T$ in a shared instance i with each k of a set of applied constraints K from Equations 20.

$$C_{max,i}(U+\Delta U,T+\Delta T)=\text{Max}\{C_{0i}(U+\Delta U,T+\Delta T),C_{ki}(t)\};$$
$$\forall k \epsilon K.$$

$$Q_{max,i}(U+\Delta U,T+\Delta T)=\text{Max}\{Q_{0i}(U+\Delta U,T+\Delta T),Q_{ki}(t)\};$$
$$\forall t \epsilon T+\Delta T. \quad (20)$$

where $C_{ki}(t)$ and $Q_{ki}(t)$ are CPU and storage resource demand vectors due to constraint k on tenant t in a shared instance i. With resource demand sum over i=1 to I and m=1 to M, the residual resource for each s of servers S are given by $$C_{residual}(s)=C_{initial}(s)-\Sigma_{im} C_{max,i}(U+\Delta U,T+\Delta T); s \text{Å} S.$$

$$Q_{residual}(s)=Q_{initial}(s)-\Sigma_{im} Q_{max,i}(U+\Delta U,T+\Delta T); \forall i \epsilon I,$$
$$\forall m \epsilon M. \quad (21)$$

where $C_{residual}(s)$ and $Q_{residual}(s)$ are CPU and memory residual resource on a server s if additional tenants $\Delta T$ and users $\Delta U$ are deployed in its shared instance i of middleware m. Residual resource must meet or exceed the total resource demand of a server s for each j of all resource types J. The effective residual resource score $E_{residual}(s)$ for all resource types J on a specific server s can be calculated by adding scores of all resource types J with weighting factors $w_j$ between 0.0 and 1.0 such that $$E_{residual}(s)=w_{j=1}*C_{residual}(s)+w_{j=2}*Q_{residual}(s)+\ldots;$$
$$s \epsilon S.$$

$$\Sigma_j w_j=1.0; \forall j \epsilon J. \quad (22)$$

Priority rules are also used to set weighting factors $w_j$ of resource type j in the order of its importance and contributions to the effective residual resource score. A specific server s* with the lowest effective residual resource score is selected for the deployment of additional tenants $\Delta T$ in its specific instance i of middleware m.

Figure 9:
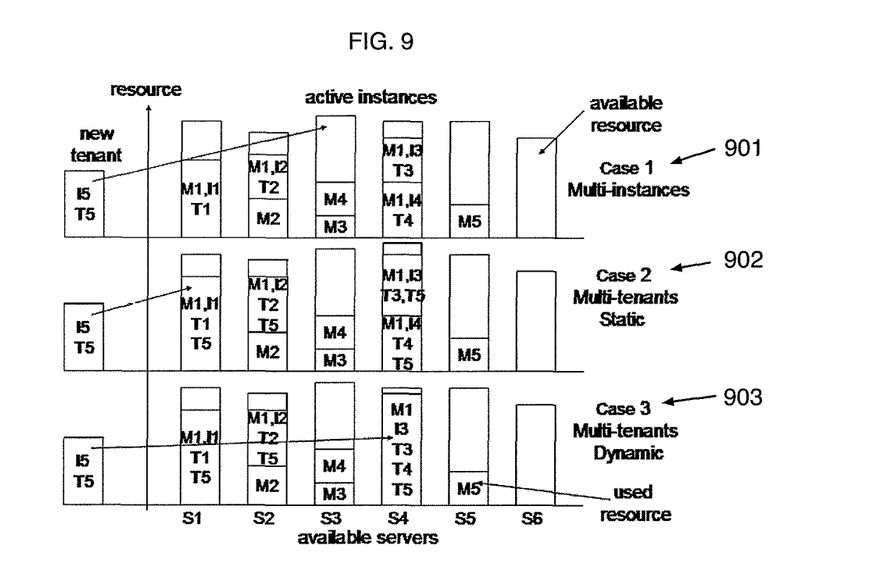
FIG. 9 is a comparative flow diagram of multi-tenant placement models for multiple applications.

The placement of multiple instances of middleware in a set of available servers with optimization is illustrated in FIG. 9. There are six available servers, namely S1, S2, S3, S4, S5 and S6 with different initial resources. There are also five different middleware, namely M1, M2, M3, M4 and M5. Four offering instances of M1, namely I1, I2, I3 and I4, have been deployed on S1, S2 and S4. Offering instances of M2, M3, M4 and M5 have also been deployed on servers S2, S3 and S5. Here, the principle rule of optimization is assumed to deploy a new offering instance on the server with the smallest residual resource after meeting resource demand of this new offering instance. As a result, larger chunks of residual resource will be retained in other servers for future offering instances with higher resource demand. Assume that instances in Case 1 901 only support multiple users, but not multiple tenants. Thus, a new offering instance I5 of M1 has to be created and deployed for a new tenant T5. Obviously, servers that have large enough residual resource to meet resource requirement of I5 are S3, S5 and S6. With optimization, conventional placement methods or commercial products will deploy I5 on S3 to leave larger chunks of residual resource on S5 and S6.

Now, let us assume all these instances support multiple tenants. Conventional placement methods or commercial products with optimization will still deploy I5 on S3. The result using an exemplary static multi-tenant placement model is different. As illustrated in Case 2 902, there may be no need to create I5 of M1 for T5 because there are existing I1, I2, I3 and I4 of M1. Residual resources in one of S1, S2 and S4 are tested to determined whether they would be large enough to meet the expanded resource requirement of I1, I2, I3 or I4 with T5. As shown in Case 2 902, the expanded resource requirement of I1 with T1 and T5 will still be within the resource limit on S1 while that of I2 with T2 and T5 will exceed the resource limit on S2. The expanded resource requirement of either I3 or I4 with T3 and T5 or T4 and T5 will also exceed the resource limit on S4. The static multi-tenant placement model with optimization will deploy T5 into I1. Case 3 903 illustrates the result using an exemplary dynamic multi-tenant placement model. Offering instances of the same middleware in the same server have to be merged into a single shared instance. Thus, T4 in I4 has to be migrated into I3 in S4. Then, I4 without any tenant is shutdown. The residual resource in S4 is tested to determined whether it would be large enough to meet the expanded resource requirement of I3 with T5. It turns out that the expanded resource requirement of I3 with T3, T4 and T5 will still be within the resource limit on S4. Thus, the exemplary dynamic multi-tenant placement model with optimization will deploy T5 into I3 on S4.

Multiple SaaS offering instances of middleware are active on shared physical resources, such as CPU and storage, of a set of servers in a SaaS and Cloud computing environment. When new tenants subscribe to a new SaaS offering, these new tenants need to be assigned to new or specific active offering instances under constraints due to SLA specifications of all tenants. Any server devoted to a new offering must have the required residual resource to host a new or an active offering instance with additional tenants and users. Moreover, rule-based or non-functional requirements, such as minimum or maximum numbers of instances or tenants on each server, have to be satisfied. Security restrictions, such as prohibition of tenant T1 and T2 deployed in the same instance and/or on the same server, are not violated. However, conventional placement tools are not tenant aware and are primarily focus on the placement of middleware instances to available servers based on their physical resources, and a new instance is always created and deployed for a new tenant.

Figure 10:
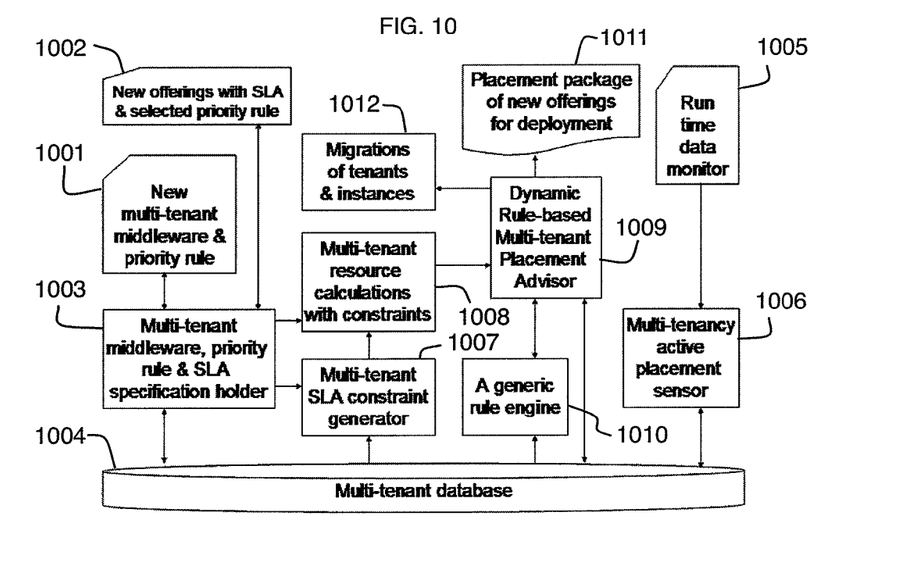
FIG. 10 is a diagram of an architecture framework of a dynamic and rule-based multi-tenant placement advisor.

An architectural framework of an exemplary dynamic and rule-based multi-tenant placement advisor is shown in FIG. 10. It includes output and input modules, functional modules and a multi-tenant database. The new multi-tenant middleware and priority rule module 1001 provides graphical user interface (GUI) and scripts for an administrator to input specifications of a new middleware and priority rule or to modify existing ones. The new offerings with SLA and selected priority rule module 1002 provides GUI for an administrator to enter number of new tenants and users, enters SLA specification for each new tenant, and select middleware and priority rules in each new offering. The multi-tenant middleware, priority rule and SLA specification holder module 1003 holds, stores, retrieves and deliveries these multi-tenant data from and to other modules and the multi-tenant database 1004. The run time data monitor module 1005 constantly monitors and collects resource usage profile of each instance on each server. The multi-tenant active placement sensor 1006 calculates resource usage of each instance and residual resource of each server. It also constructs and stores resource usage and residual matrices. The dimension of these matrices is two with J columns for different resource types and I rows for different instances in a server. The multi-tenant SLA constraint generator module 1007 constructs and stores constraints, rule-based or non-functional requirements and restrictions due to SLAs of new tenants, and retrieves those existing ones of active tenants. The multi-tenant resource calculations with constraints module 1008 calculates resource demand with applied constraints. The dynamic rule-based multi-tenant placement advisor module 1009 calls a generic rule engine module 1010 to retrieve priority rules and applies them to modify the initial placement list such that all non-functional requirements are satisfied and output a placement packet of new offerings for deployment 1011. Moreover, cross tenant security restrictions are also applied to modify the semi-final placement list. The dynamic rule-based multi-tenant placement advisor module 1009 also calls the migrations of tenants and instances module 1012 to migrate tenants among shared instances and instances among servers for optimization purpose.

Figure 11:
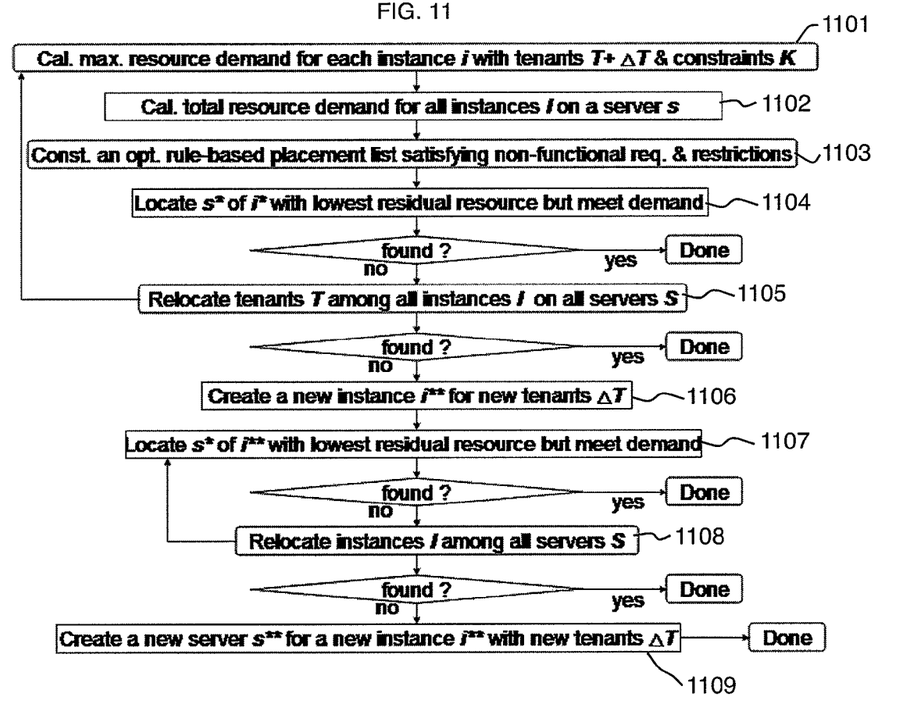
FIG. 11 a flow diagram of a method for dynamic and rule-based multi-tenant placement algorithm.

The flow chart of a dynamic and rule-based multi-tenant placement algorithm is shown in FIG. 11. At block 1101, the maximum resource demand for each instance i with tenants T+ΔT and constraints K is calculated. At block 1102, the total resource demand for each server s with all of its instances I is also calculated. At block 1103, an optimal rule-based placement list satisfying all constraints, non-functional requirements and restrictions according to the priority rule list is constructed. At block 1104, a particular server s* with its particular instance i* of T+ΔT is located because its residual resource is the lowest among all servers S, and within its resource limit. At block 1105, tenants T is relocated among I on S to free up larger chunks of residual resource in certain servers s if s* is not found. At block 1106, it decides to create a new instance i** for new tenants ΔT if s* is still not found. At block 1107, s* with i is located because its residual resource is the lowest among S with i, and within its resource limit. At block 1108, I is relocated among S to free up larger chunks of residual resource in certain servers s if s* is not found. At block 1109, it decides to create i in a new server s for ΔT if s* is still not found.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 12:
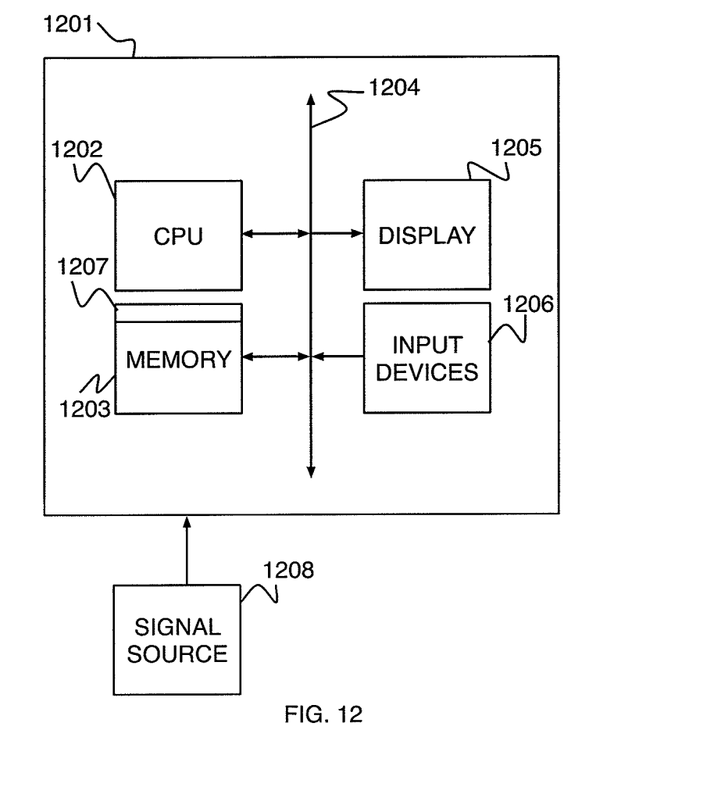
FIG. 12 is a diagram of a computer system for implemented a computer system according to FIGS. 1-11.

Referring to FIG. 12, according to an embodiment of the present invention, a computer system 1201 for assigning tenants to offering instances can comprise, inter alia, a central processing unit (CPU) 1202, a memory 1203 and an input/output (I/O) interface 1204. The computer system 1201 is generally coupled through the I/O interface 1204 to a display 1205 and various input devices 1206 such as a mouse and keyboard. The support circuits can include circuits such as cache, power supplies, clock circuits, and a communications bus. The memory 1203 can include random access memory (RAM), read only memory (ROM), disk drive, tape drive, etc., or a combination thereof. The present invention can be implemented as a routine 1207 that is stored in memory 1203 and executed by the CPU 1202 to process the signal from the signal source 1208, e.g., the user or administrator, or non-tenant aware application. As such, the computer system 1201 is a general purpose computer system that becomes a specific purpose computer system when executing the routine 1207 of the present invention.

The computer platform 1201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for assigning tenants to offering instances, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for assigning tenants of users to offering instances of an application or middleware, the method comprising:

representing a set of offerings as respective offering instances of the application or middleware available from a server;

determining server resource capacity of the server;

representing constraints associated with the tenants and the offering instances;

generating a mapping of the tenants to the offering instances based on the server resource capacity and constraints; and assigning at least one of the tenants to at least one of the offering instances according to the mapping, wherein the offering instance is made accessible to the users of the assigned tenant.

2. The computer readable medium of claim 1, wherein the method further comprises provisioning a new offering instance if no offering instance maps to a tenant.

3. The computer readable medium of claim 1, wherein the method further comprises migrating the offering instance assigned to the tenant to another server with a server resource capacity meeting a requirement of the tenant.

4. The computer readable medium of claim 1, wherein the method further comprises satisfying a non-functional requirement.

5. The computer readable medium of claim 4, wherein the non-functional requirement is a predetermined maximum number of tenants on each offering instance of the application.

6. The computer readable medium of claim 4, wherein the non-functional requirement is a predetermined minimum number of offering instances on each server.

7. The computer readable medium of claim 1, wherein the method further comprises imposing a security restriction.

8. The computer readable medium of claim 7, wherein the security restriction prohibits two or more tenants deployed in the same offering instance or on the same server.

9. The computer readable medium of claim 1, wherein the method further comprises summing resources with weighting factors for assigning the tenants of users to offering instances using of an effective residual resource score.

10. System for assigning tenants of users to offering instances of an application or middleware comprising:
   a database for storing multi-tenant information; and
   a processor for executing instructions of a plurality of modules processing the multi-tenant information, the modules comprising:
   a multi-tenant application module representing a set of offerings as respective offering instances of the application or middleware available from a server;
   an active placement module determining server resource capacity of the server;
   a constraint generator module representing constraints associated with the tenants and the offering instances; and
   a multi-tenant placement module generating a mapping of the tenants to the offering instances based on the server resource capacity and constraints and assigning a tenant to an offering instance according to the mapping, wherein the offering instance is made accessible to the users of the assigned tenant.

11. The system of claim 10, wherein the multi-tenant placement module migrates the offering instance assigned to the tenant to another server with a server resource capacity meeting a requirement of the tenant.

12. The system of claim 10, further comprising a constraint module imposing a security restriction.

13. The system of claim 10, wherein the multi-tenant placement module sums resources with weighting factors for assigning the tenants of users to offering instances using of an effective residual resource score.

14. A non-transitory computer readable medium embodying instructions executable by a processor to perform a method for assigning, with constraints, tenants of users to offering instances, comprising:
   collecting a resource usage profile of a plurality of offering instances of a software application or middleware on each server;
   determining resource usage of the offering instances and a residual resource of each server;
   retrieving constraints for a plurality of tenants on a shared offering instance of the application or middleware on a server;
   determining required resources with the constraints for tenants in the shared offering instance on the server;
   generating a mapping of the tenants to the shared offering instance based on the resource usage of the offering instance of the application or middleware, the resource capacity of the server and the constraints of the tenant; and
   assigning the tenant to the shared offering instance according to the mapping, wherein the shared offering instance is made accessible to the users of the assigned tenant.

15. The computer readable medium of claim 14, wherein the method further comprises providing a specification and multi-tenant resource usage model of the software application or middleware.

16. A non-transitory computer readable medium embodying instructions executable by a processor to perform a method for dynamic and rule-based multi-tenant placement, comprising:
   determining a maximum resource demand of a plurality of tenants for a plurality of offering instances of an application, wherein at least one group of the plurality of tenants shares at least one of the offering instances;
   determining constraints of the tenants;
   determining a resource demand for each server with all offering instances;
   constructing a rule-based placement list satisfying the constraints, according to a priority rule list;
   locating a server and an offering instance on the server having a lowest residual resource among all servers; and
   relocating the tenants from the server to increase a residual resource the server.

17. The computer readable medium of claim 16, wherein the method further comprises creating an offering instance for a tenant if no offering instance is assigned.

* * * * *